United States Patent [19]

Sung et al.

[11] Patent Number: 5,608,877
[45] Date of Patent: Mar. 4, 1997

[54] RESET BASED COMPUTER BUS IDENTIFICATION METHOD AND CIRCUIT RESILIENT TO POWER TRANSIENCE

[75] Inventors: Chih-Ta Sung, Princeton, N.J.; Tzoyao Chan, Saratoga; Jih-Hsien Soong, Cupertino, both of Calif.

[73] Assignee: Cirrus Logic, Inc., Fremont, Calif.

[21] Appl. No.: 409,243

[22] Filed: Mar. 24, 1995

[51] Int. Cl.$^6$ .................. G06F 13/00; G06F 13/42
[52] U.S. Cl. .................. 395/284; 395/306; 395/308; 395/309
[58] Field of Search .................. 395/284–287, 395/306–309, 280–281

[56] References Cited

U.S. PATENT DOCUMENTS

| | | | |
|---|---|---|---|
| 3,979,732 | 9/1976 | Hepworth et al. | 395/288 |
| 4,075,693 | 2/1978 | Fox et al. | 364/200 |
| 4,212,057 | 7/1980 | Devlin et al. | 395/478 |
| 4,683,534 | 7/1987 | Tietjen et al. | 364/200 |
| 4,716,525 | 12/1987 | Gilayni et al. | 364/200 |
| 4,775,931 | 10/1988 | Dickie et al. | 365/200 |
| 4,807,282 | 2/1989 | Kazan et al. | 379/284 |
| 4,935,894 | 6/1990 | Ternes et al. | 395/309 |
| 5,175,536 | 12/1992 | Aschliman et al. | 340/825 |
| 5,191,653 | 3/1993 | Banks et al. | 395/275 |
| 5,245,703 | 9/1993 | Hubert | 395/200 |
| 5,255,376 | 10/1993 | Frank | 395/325 |
| 5,263,172 | 11/1993 | Olnowich | 395/800 |
| 5,280,587 | 1/1994 | Shimodaira et al. | 395/275 |
| 5,376,928 | 12/1994 | Testin | 340/825 |
| 5,379,384 | 1/1995 | Solomon | 395/325 |
| 5,386,517 | 1/1995 | Sheth et al. | 395/275 |
| 5,454,081 | 9/1995 | Thome | 395/281 |
| 5,469,558 | 11/1995 | Lieberman et al. | 395/285 |
| 5,495,594 | 2/1996 | MacKenna et al. | 395/500 |

Primary Examiner—Gopal C. Ray
Attorney, Agent, or Firm—Robert Platt Bell and Associates, P.C.

[57] ABSTRACT

An automatic bus identification circuit is provided in a device to reliably detect system bus type on power up despite fluctuations in supply voltage. A system bus type signal is received over a multi-function input line at a first input and a reset signal received over a set line at a second input. A bus type identification circuitry is provided to latch the system bus type signal upon power up and continuously output this signal as a system bus type identification signal. To prevent the influence of disturbances in the power supply upon power-up, a flip-flop is provided to output a logic signal in response to a system reset signal. The flip-flop is configured with a strong-N type inverter to insure that the flip-flop will be set into a grounded state as power is applied to the circuit, despite the influence of transient power supply voltages.

15 Claims, 9 Drawing Sheets

5,608,877

RESET BASED COMPUTER BUS IDENTIFICATION METHOD AND CIRCUIT RESILIENT TO POWER TRANSIENCE

CROSS-REFERENCE TO RELATED APPLICATIONS

The subject matter of this application is related to that in copending U.S. application Ser. No. 08/130,090 filed Sep. 30, 1993 entitled "Automatic Bus Setting, Sensing and Switching Interface Unit" and incorporated herein by reference.

FIELD OF THE INVENTION

The present invention relates to an apparatus and method for identifying a bus type in a computer system. The invention has particular application to so-called ISA and PCI bus type systems.

BACKGROUND OF THE INVENTION

Personal computer (PCs) may be provided with one of a number of architectures. One popular architecture is the so-called ISA (Industry Standards Association) bus type PC. As the name implies, a PC having an ISA bus architecture may be designed around particular system bus format. The ISA bus architecture is a public domain architecture for a computer system agreed upon by a number of computer and component manufacturers called the Industry Standards Association.

Other types of architectures have been promoted as successors to the ISA bus format, providing enhanced features such an increased I/O speed and peripheral device identification. The EISA and PCI bus designs are two examples of newer bus designs. For a computer component manufacturer, variations in bus types may pose design difficulties, as a given computer component (e.g., logical device) may be desirable for use with a number of different architectures.

Manufacturing separate components compatible with different bus designs may be costly in terms of both manufacturing and inventory. Moreover, components specially design for one bus design reduce the interchangability of components which made the original ISA bus design successful.

In particular, in the ISA bus design, a reset signal (i.e., power on reset or reboot) may use an active high signal (e.g. logic level 1) whereas a PCI bus design may use an active logic low (e.g., logic level 0) for a reset signal. Thus, in order to incorporate a semiconductor circuit into, for example, an add-on board for a PC, it may be necessary to reconfigure the logic level of the reset signal. DIP switches, jumpers or the like may be utilized to provide a manual technique for reconfiguring a reset signal for different bus applications. However, such devices add costly circuitry to an add-on board or additional pins for a semiconductor device and in addition may require an additional reconfiguration step by the user.

Even if a device is configured manually using DIP switches, jumpers or the like, during a power on cycle a power on signal, either Vdd or Vcc power supply may be unstable during the first few microseconds, milliseconds, or even first hundred milliseconds. Power may be dropped due to parasitic inductance on the motherboard, ground noise or power noise. During a power-on cycle, a power supply may not be stable, and thus logic levels (0 and 1) may be difficult to detect.

SUMMARY AND OBJECTS OF THE INVENTION

A device for use in a computer system having one of a predetermined number of bus types comprises a first input line for receiving a first signal indicating a bus type upon computer system power up and a second input line for receiving a system reset signal from the computer system. A bus type identification circuit is coupled to the first and second input lines for latching the first signal and outputting a bus type identification signal. The bus type identification circuit includes a first latch coupled to the first and second input lines for latching the first signal in response to the system reset signal and a flip-flop coupled to the second input line and a supply voltage for outputting the supply voltage in response to the system reset signal. A second latch is coupled to the first latch and the flip-flop for receiving and latching the first signal from the first latch and outputting the first signal as a bus type identification signal in response to the supply voltage received from the flip-flop. The flip-flop is configured to generate a ground level voltage upon application of the supply voltage to the flip-flop during power-on and generate a low to high logic signal during the reset cycle.

The flip-flop comprises two latches. The second latch of the flip-flop comprises a first inverter having a input terminal coupled to the supply voltage and an output terminal coupled to an output of the flip-flop and a second inverter having an input terminal coupled to the output terminal of the first inverter and an output terminal coupled to the input terminal of the first inverter. The first inverter comprises a first transistor of a first type having a first predetermined threshold voltage and a second transistor of a second type having a second predetermined threshold voltage. The first threshold voltage is lower than the second threshold voltage such that the first inverter will output a predetermined level logic signal in response to a transient voltage input such that the flip-flop will output a ground level signal in response to a transient input voltage.

It is an object of the present invention to reliably and automatically detect system bus type in a device coupled to a system bus without the need for a user to set DIP switches, jumpers or the like.

It is a further object of the present invention to detect host bus type during power up and in spite of fluctuations in power supply voltage during power It is a further object of the present invention to output a latched bus type signal which is latched at power up and does not subsequently change.

It is a further object of the present invention to reduce pin count needed in a semiconductor circuit to automatically detect bus type.

It is a further object of the present invention to provide a reliable bus type identification circuit using a minimal amount of transistors, gates and chip space.

BRIEF DESCRIPTION OF THE DRAWINGS

FIGS. 7a–7b is a waveform diagrams illustrating the operation of the bus identification circuitry of FIG. 3.

DETAILED DESCRIPTION OF THE INVENTION

Figure 1A:
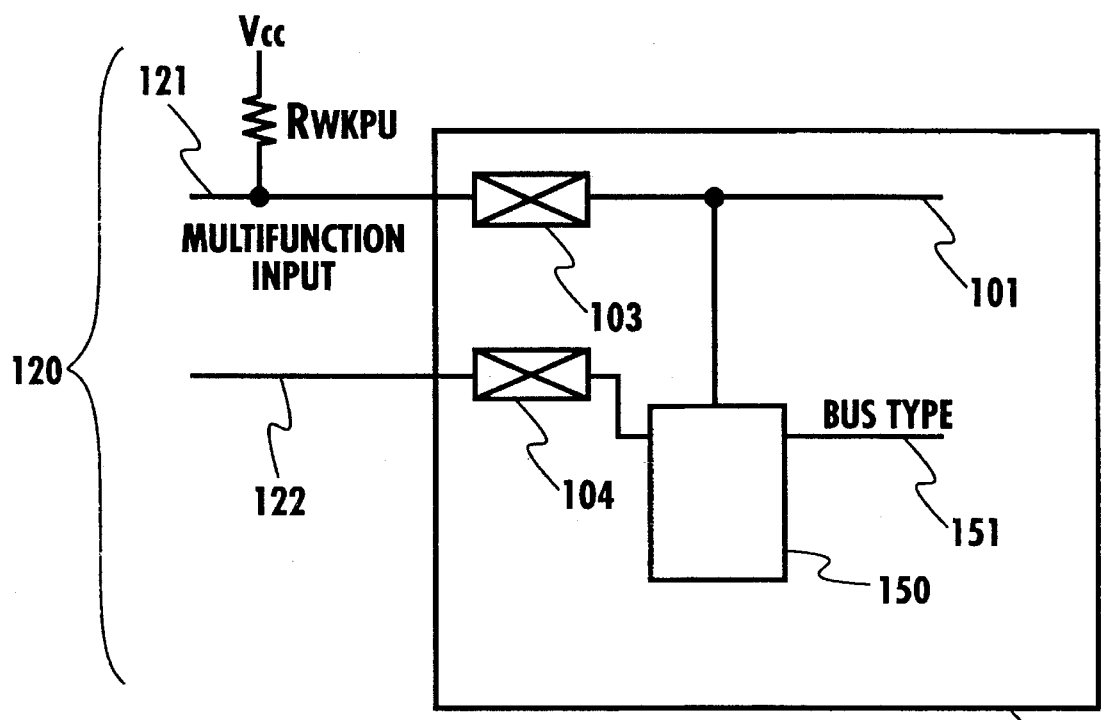
FIG. 1A illustrates the apparatus of the present invention as implemented in an ISA bus type system.

FIG. 1A illustrates the apparatus of the present invention as implemented in an ISA bus type system. In FIG. 1A, a device 100 is shown coupled to an ISA system bus 120. For the purposes of this application, the term device may include a logical device or peripheral such as an I/O device, sound card, VGA controller, network interface, memory expansion card, or the like. Device 100 may comprise, for example, a semiconductor circuit provided in an add-on card for a PC which may be coupled to an expansion slot on a PC motherboard. Device 100 may also comprise a semiconductor circuit provided on a PC motherboard, for example on a laptop computer or the like.

ISA system bus 120 may include a multi-function input line 121 and ISA reset line 122. Multi-function input line 121 may be provided for transmitting data or other signals to a device from a host CPU (not shown). Multi-function input line 121 may be coupled to device multi-function line 101 in device 100 through contact 103. Multi-function input line 121 may be tied to voltage Vcc through a weak pull-up resistor $R_{WKPU}$. Weak pull-up resistor $R_{WKPU}$ may have a value on the order of 5 to 100 Kilo-Ohms. Weak pull-up resistor $R_{WKPU}$ serves to hold multi-function input line 121 high.

Figure 2:
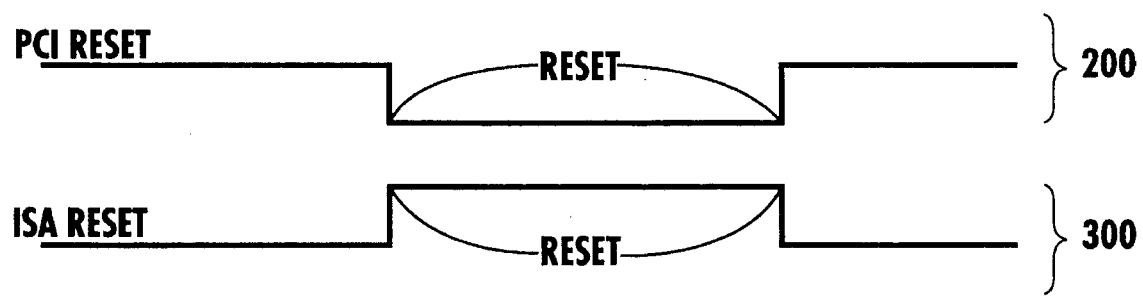
FIG. 2 is a waveform diagram illustrating the reset signals for PCI and ISA bus type systems.

ISA system bus 120 may also include ISA reset line 122. ISA reset line 122 may transmit a reset signal on ISA system bus 120 upon power up or system reset. Waveform 200 in FIG. 2 illustrates an ISA reset signal on ISA reset line 122. ISA reset line 122 may stay at a low logic level (e.g., 0). Upon power-up or system reset, a high reset pulse is generated as shown in waveform 200 of FIG. 2.

Within device 100 is provided bus identification circuit 150. Bus identification circuit 150 is provided coupled to device multifunction input line 102 and ISA reset line 122 through pin bonding pad 104. Bus identification circuit 150 may output a bus type identification signal 151 indicating whether device 100 is coupled to an ISA or PCI type bus system. Bus type identification signal 151 may be utilized by device 100 to reconfigure device to operate with a specific bus type as disclosed, for example, in co-pending application Ser. No. 08/130,090 filed Sep. 30, 1993 and incorporated herein by reference. The remainder of the circuitry within device 100 may be provided to operate a logical device or peripheral as is known in the art and is not essential to the understanding of the present invention.

Figure 1B:
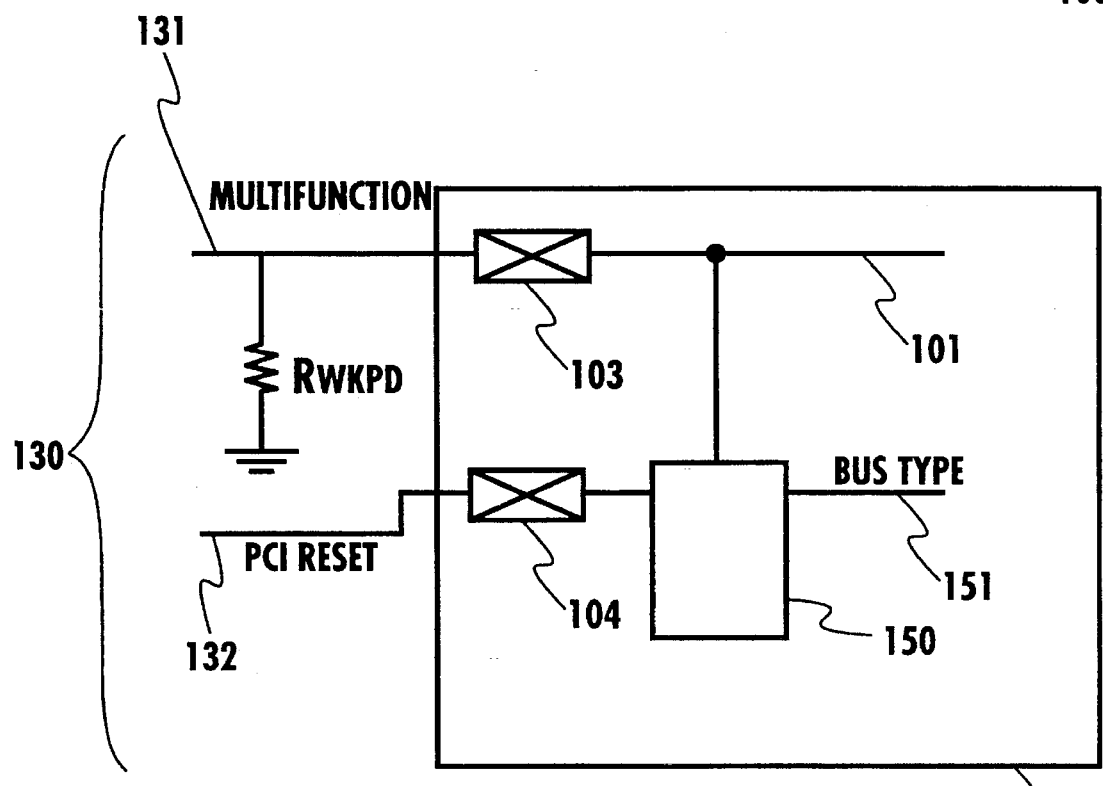
FIG. 1B illustrates the apparatus of the present invention as implemented in an PCI bus type system.

FIG. 1B illustrates the apparatus of the present invention as implemented in an PCI bus type system. In FIG. 1B, device 100 is shown coupled to an PCI system bus 130. PCI system Bus 130 may include a multi-function input line 131 and PCI reset line 132. Multi-function input line 131 may be provided for transmitting data or other signals to a device from a host CPU (not shown). Multi-function input line 131 may be coupled to device multi-function input line 101 in device 100 through contact 103. Multi-function input line 131 may be tied to ground through a weak pull-down resistor $R_{WKPD}$. Weak pull-down resistor $R_{WKPD}$ may have a value on the order to 5 to 100 Kilo-Ohms. Weak pull-down resistor $R_{WKPD}$ serves to hold multi-function input line 131 low when the line is not driven by another device.

PCI system bus 130 may also include PCI reset line 132. PCI reset line 132 may transmit a reset signal on system bus 130 upon power up or system reset. Waveform 300 in FIG. 2 illustrates a PCI reset signal on PCI reset line 132. PCI reset line 132 is generally at high logic level (e.g., 1). Upon power-up or system reset, a low reset pulse is generated as shown in waveform 300 of FIG. 2.

Bus identification circuit 150 is provided coupled to device multifunction input line 102 and PCI reset line 132 through pin bonding pad 104. Bus identification circuit 150 may output a bus type identification signal 151 indicating whether device 100 is coupled to an ISA or PCI type bus system. Bus type identification signal 151 may be used by device 100 to indicate whether the device has been installed in an ISA or PCI type system. Device 100 may then configure itself properly according to bus type signal 151 to operate in the corresponding type system.

It may be possible to determine system bus type from the logic level of device multi-function input line 101 during system power up. However, this logic level must be latched upon power up, as multi-function input line 121 or 131 for an ISA or PCI bus system may be subsequently used for transmitting data or other functions after initial power up.

However, during system power up, power supply voltages may be unstable or may oscillate due to external influences, noise, system reactance, or the like. Thus, if a system type signal is to latched directly from device multi-function input line 101, it is possible that the signal may be latched at the wrong time and thus be erroneous. If the wrong bus type signal is latched, device 100 may configure itself improperly for the host bus system or may fail to reset properly. Bus identification circuit 150 is provided to properly identify system bus type despite instabilities in power supply voltage levels upon power up.

Figure 3:
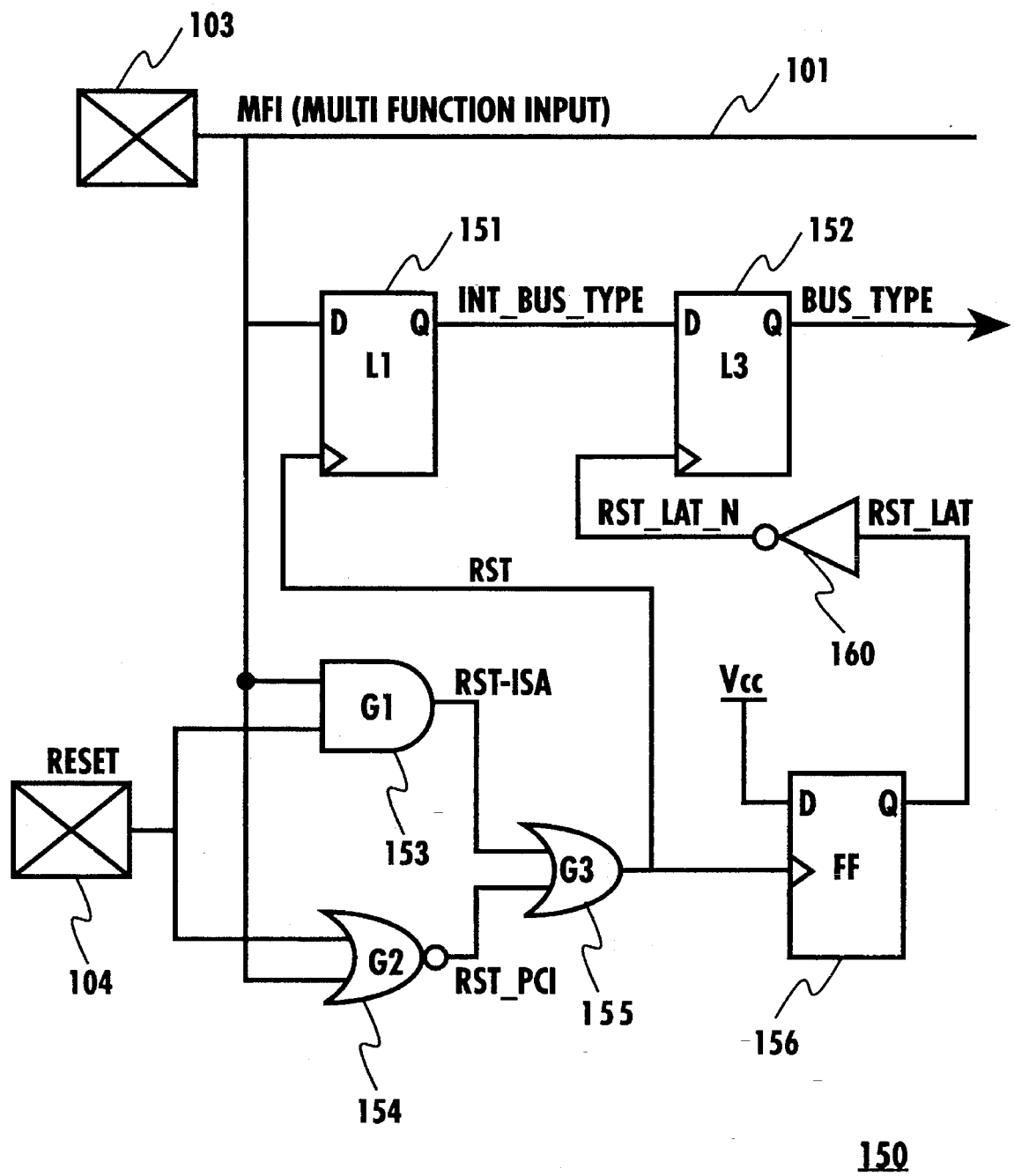
FIG. 3 is a block diagram of bus identification circuit 150 of FIGS. 1A and 1B.

FIG. 3 is a block diagram of bus identification circuit 150 of FIGS. 1A and 1B. In FIG. 3, latch 151 is provided to receive a logic level signal from device multi-function input line 101 at its D input. When latch 151 is clocked, bus type signal INT_BUS_TYPE is output to latch 152.

Latch 151 is clocked by a signal output from combinational logic circuitry including AND gate 153, NOR gate 154 and OR gate 155. While shown here as discrete logic gates, it can be appreciated that other types of logical circuitry, software, or the like may be used to implement the circuit. The truth table for the combinational logic circuitry comprising AND gate 153, NOR gate 154 and OR gate 155 is shown in Table 1.

TABLE 1

| RESET (104) | MFI (103) | G1 104 AND 103 | G2 104 NOR 103 | G3 G1 OR G2 |
|---|---|---|---|---|
| 1 | 0 | 0 | 0 | 0 |
| 0 | 0 | 0 | 1 | 1 |
| 0 | 1 | 0 | 0 | 0 |
| 1 | 1 | 1 | 0 | 1 |

As illustrated in Table 1, the output the combinational logic circuitry including AND gate 153, NOR gate 154 and OR gate 155 should go high on system reset, regardless of whether device 100 is plugged into an ISA or PCI type system bus. For a PCI-type system, RESET signal 122 (at pin bonding pad 104) will go low upon reset, and pull-down resistor $R_{WKPD}$ will pull the level of multi-function input line 131 (and thus contact 103) low in the absence of any data signals from a host computer. When both inputs 104 and 103 are low, the output of gate G3 155 will be high. Similarly, for an ISA-type system, reset signal 132 (at pin bonding pad 104) will go high on reset and pull-up resistor $R_{WKPU}$ will pull multi-function input line 121 (and thus contact 103) high in the absence of any data signals from a host computer. When both inputs 104 and 103 are high, the output of gate G3 155 will be high.

The output of gate G3 155 is output as signal RST as a clocking signal to latch 151. Signal RST is illustrated in FIG. 2B. Thus, upon reset, latch 151 will output a logic level signal INT_BUS_TYPE indicative of the type of bus (ISA or PCI) device 100 is coupled to. In general, a low logic level (e.g., 0) indicates that device 100 is coupled to a PCI bus type system, whereas a high logic level (e.g., 1) may indicate that device 100 is coupled to an ISA bus type system.

In order to reduce the effect of power supply instability or oscillation upon power up, an additional latch 152 and flip-flop 156 are provided. Flip-flop 156 receives at its D input power supply voltage VCC. Flip-flop 156 is clocked by signal RST from OR gate G3 155. When a reset signal is generated in either a PCI or ISA system, signal RST clocks flip-flop 156 such that signal RST_LAT is output. Inverter 160 inverts signal RST_LAT to produce signal RST_LAT_N. Signal RST_LAT_N clocks latch 152 such that signal INT_BUS_TYPE is output to device 100.

FIGS. 7a–f are a waveform diagram illustrating the operation of the circuitry of FIG. 3. As shown in FIG. 7a, either an ISA or PCI reset signal is received over pin bonding pad 104. Combinational logic circuitry comprising gates 153, 154, and 155 output signal RST which comprises a positive going pulse, regardless of whether the host bus is an ISA or PCI type. Note that signal RST may be slightly delayed from the source reset signal, as illustrated in FIG. 7b, due to gate delays. The pulse width of the signal RST is greater than the settling time of latch 151 such that valid data is latched within latch 151.

When signal RST goes high, latch 151 is turned "on" and a logic signal from device multi-function line 101 is input to latch 151. At the trailing edge of the RST pulse, latch 151 is turned "off" and whatever logic value is stored (latched) in latch 151 is subsequently and continuously output as signal INT_BUS_TYPE as illustrated in FIG. 7c. After initial power-up, the logic level on device multi-function input line 101 may take different values as data or other information is transmitted over device multi-function input line 101. However, since the initial logic level on device multi-function input line has been latched in latch 151, the bus type identification INT_BUS_TYPE is safely stored.

For the purposes of illustration, the bus type illustrated in FIGS. 7a–f is an ISA type (high level logic signal). However, it can be appreciated that the waveform diagrams of FIGS. 7a–f may be suitably modified to illustrate the condition where a PCI host bus is detected.

Flip-flop 150 initially outputs a low level output signal upon power up. As will be discussed in more detail below, it is important that flip-flop 150 output a low level logic signal despite the influence of unstable supply voltages. If a high level, or transient voltage is output, latch 152 may output an incorrect bus type identifier.

As illustrated in FIG. 7d, on the trailing edge of signal RST, flip-flop 156 will drive signal RST_LAT high. Thus, signal RST_LAT_N will go low at the trailing edge of signal RST. Signal RST_LAT_N will turn latch 152 "on" upon power up as illustrated in FIG. 7e. Latch 152 may then input a logic level signal from signal INT_BUS_TYPE. At the trailing edge of signal RST_LAT_N, latch 152 is turned "off" and whatever logic level which was valid at the input of latch 152 is then continuously output as signal BUS_TYPE as illustrated in FIG. 7f. For the purposes of illustration in FIGS. 7a–f, signal BUS_TYPE is shown indicating an ISA type host bus. As illustrated in FIGS. 7a–f, an amount of time between the leading edge of the RST pulse and the trailing edge of signal RST_LAT_N is allowed for settling time of latch 152.

Figure 4:
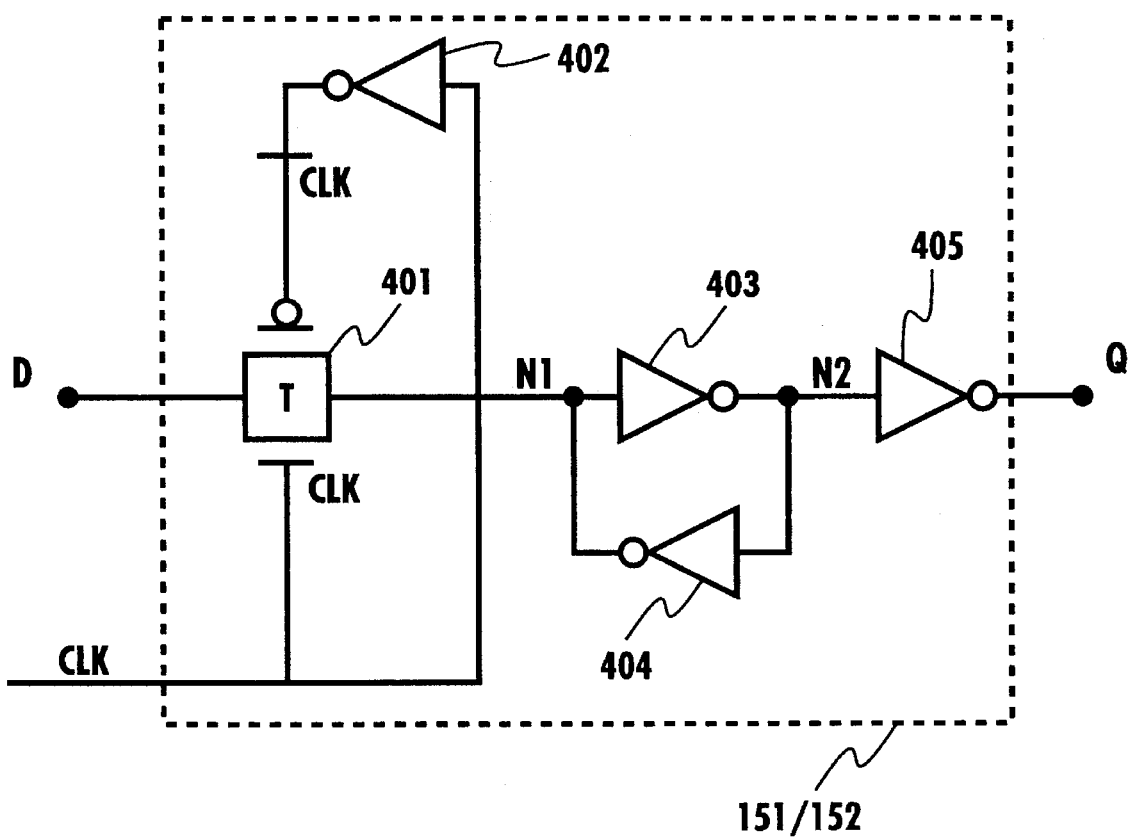
FIG. 4 is a block diagram of one latch of the bus identification circuit of FIG. 3.

FIG. 4 is a schematic diagram of either of latches 151 and 152. Latches 151 and 152 may comprise so-called "transparent" latches. Latches 151 and 152 may each comprise transistor T1 401 and inverters 402, 403, 404, and 405. Transistor T1 401 is fed an input signal D, clocked by reset signal CLK to node N1. Inverters 403 and 404 form a feedback loop to hold a logic level clocked through transistor T1 401. The logic level at node N2 passes through inverter 405 and output as output signal Q.

Figure 5:
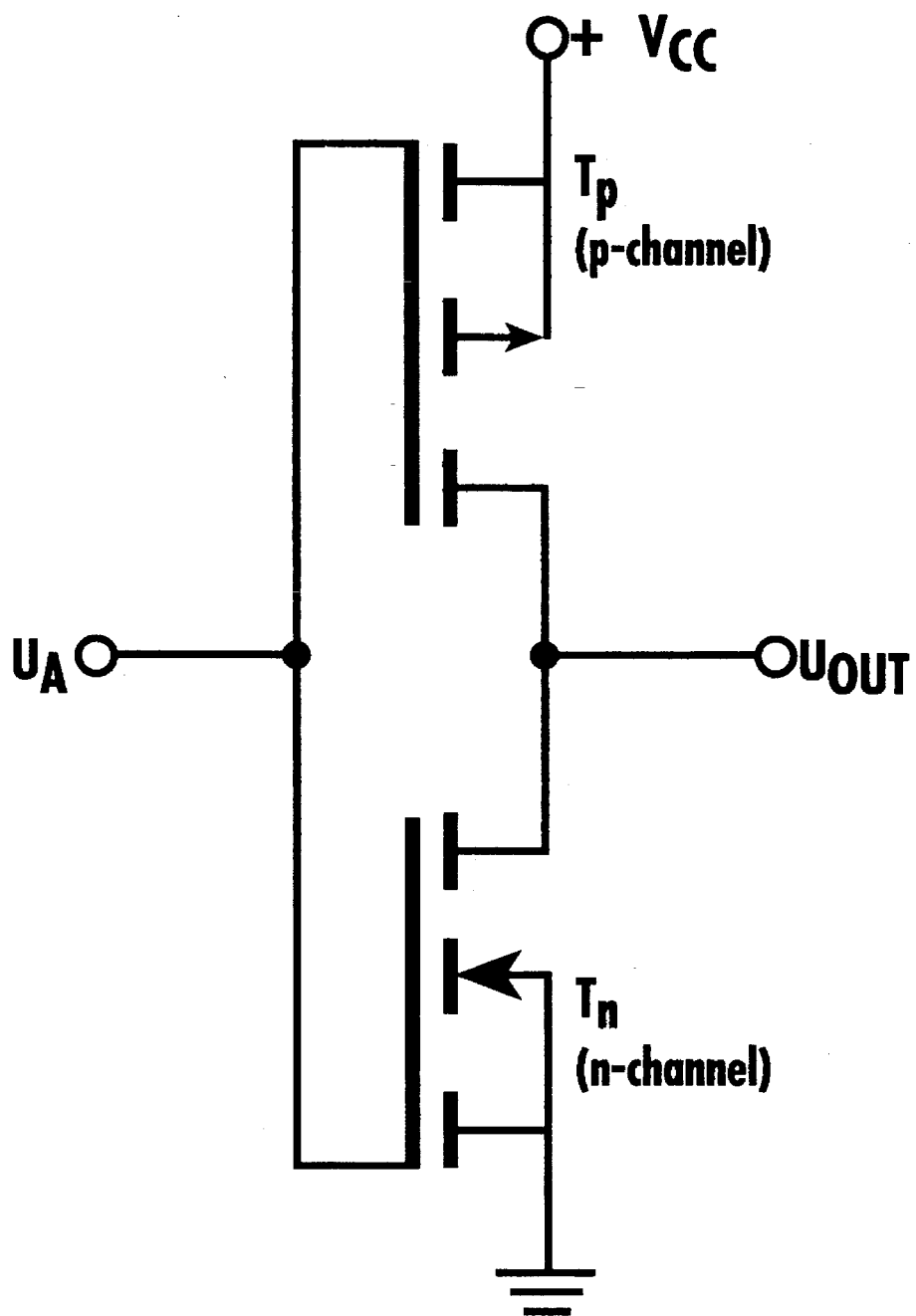
FIG. 5 is a schematic of an inverter formed using CMOS circuitry.

Each inverter 404, 403, 404 and 405 may comprised of one P-type MOS transistor $T_p$ and one N-type MOS transistor $T_n$ as illustrated in FIG. 5. In the one-micron technology commonly used in small latch design, the ratio of the gate width w to gate length 1 is typically on the order of 2:1 for P-type and 4:1 for N-type MOS transistors. However, the ratio of gate width to length may be altered for inverters 403 and 404 in order to compensate for variations in power supply voltage on power-up, as will be discussed below in connection with FIG. 6.

Figure 9A:
FIGS. 9a–9i is a waveform diagrams illustrating the operation of the flip-flop of FIG. 6.
Figure 9B:
Figure 9C:

Flip-flop 156 may be specially constructed to reduce the effect of power supply noise on the operation of bus identification circuit 150. Flip-flop 156 essentially comprises two inverter circuits in series. Supply voltage VCC is input as an input signal to a first gating inverter 601 which is clocked by clock signal CLK. FIGS. 9a–i illustrate waveforms and inverter status for the nodes and elements of the flip-flop of FIG. 6. As applied to the circuit of FIG. 3, clock signal CLK is signal RST as illustrated in FIG. 9a. Referring to FIG. 9, when signal RST (clock signal CLK) goes high, inverter 601 is turned on and the input logic value ($V_{CC}$) is inverted and passed is passed to node N5 as illustrated in FIGS. 9b and 9c. At power-up, the voltage at node N5 may be in a transient state, however, at the leading edge of signal RST, node N5 is goes low.

Figure 9D:
Figure 9E:

Inverters 603 and 604 form a first latch, latching the value of the voltage at node N5. Inverter 604 is inversely clocked by clock signal CLK such that inverter 604 is only activated when signal CLK is low. Thus, when signal RST goes low the value of the voltage at N5 is latched. The logic level at the output of inverter 603, node N6 will be the inverse of value of node N5, as illustrated in FIG. 9d–e. Thus, when signal RST goes high, a high level logic signal may be present at node N6. When signal RST goes low, the high level signal at node N6 is latched.

Figure 9F:
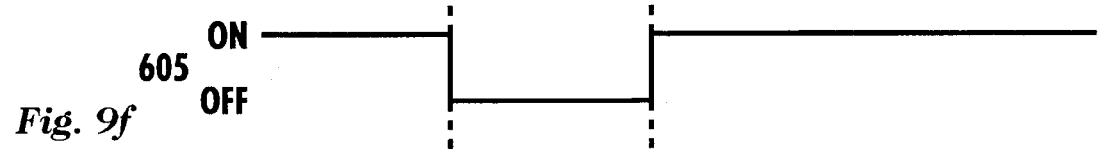
Figure 9G:

Inverter 605 is inverse gated by clock signal CLK as illustrated in FIG. 9f. When signal RST goes high, inverter 605 is shut off. When signal RST goes low, inverter 605 is active. At the trailing edge of signal RST, therefor, the logic level at node N6 is latched and fed through inverter 605 and the logic level at node N7 will go low as illustrated in FIG. 9g. Inverters 606 and 607 form a second latch. As will be discussed below, inverters 606 and 607 are configured such that they will output a low level logic signal upon power up, despite the influence of power supply noise.

Figure 9H:
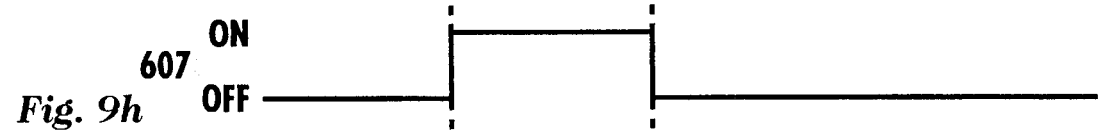
Figure 9I:

Inverter 607 is clocked by clock signal CLK such that when signal the RST goes high, the value of the voltage at node N7 is latched. Upon power up, signal RST is low, and thus inverter 607 is "off". When signal RST goes high, inverter 607 is on the logic value at node N7 is latched. The logic value at node N7 is inverted by inverter 606 to produce a logic signal at node N8 which will go high at the trailing edge of signal RST as illustrated in FIGS. 9h–i. The logic signal at node N8 is output as signal RST_LAT.

Inverters 602, 603 and 604 may be constructed with proportioned N-type and P-type transistors such that neither the P-type or N-type transistor is stronger or weaker than the other. Typical ratios for inverters 602, 603 and 604 may be w/l=4:1 for a P-channel MOS transistor and w/l=2:1 for a N-channel MOS transistor. As is known in the art, due to the operating characteristics of N-type and P-type MOS transistors, it is necessary to make the gate for the P-type MOS transistor twice as wide as the gate of the N-channel MOS transistor in order that the transistors have equivalent and balanced strengths and operating characteristics which helps in getting better noise immunity.

Figure 8A:
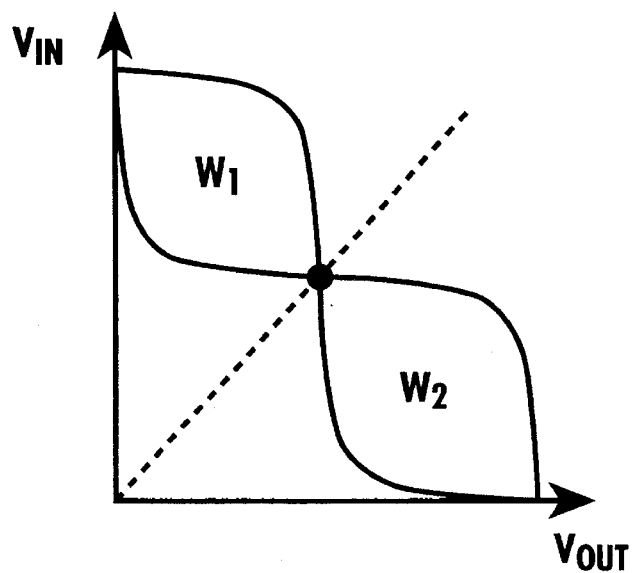
FIGS. 8A–8C illustrate the operation of strong and weak inverters on latch operation.

FIG. 8A illustrates the transfer curves for a pair of balanced inverters comprising a latch as shown in FIG. 4. For an ideal latch, each inverter should have an abrupt transfer curve such that each inverter abruptly transfers from a low state to a high state at a predetermined threshold voltage. The larger the areas W1 and W2 encompassed by the transfer curves of each inverter, the better the performance of the latch. FIG. 8A illustrates a balanced latch, where W1=W2. This type of inverter has balanced high and low voltage noise immunity.

For second latch of flip-flop 156, inverter 606 may be constructed as a "strong N" inverter. The ratio w/l for the P-type MOS transistor may take a value of 4:2, 4:3, 3:2 or 2:2, so long as the value generally remains at or above 2:2. The ratio w/l for the N-type MOS transistor may take a value of 4:1. Thus, the gate width of the N-type MOS transistor is structured such that the N-type MOS transistor is stronger than the P-type MOS transistor. Thus, inverter 606 may be referred to as a strong-N/weak-P inverter. The strong-N inverter will tend to output a low level logic signal in response to an unstable input. The N-type transistor will have a lower threshold voltage and be more likely to conduct than its P-type counterpart. Since the N-type transistor is coupled to ground, the output will go low.

Inverter 607 may either be constructed in a similar manner to inverters 605, 601 and 602, or as a "weak N" inverter. For a "weak N" inverter, the ratio w/l for the N-type MOS transistor may take a value of 2:2, whereas the ratio w/l for the P-type MOS transistor may take a value of 4:1. Inverter 607 may be referred to as a weak-N/strong-P type inverter. The weak-N/strong-P inverter will tend to output a high level logic signal in response to an unstable input. The P-type transistor will have a lower threshold voltage and be more likely to conduct than its N-type counterpart. Since the P-type transistor is coupled to $V_{CC}$, the output will go high.

Figure 6:
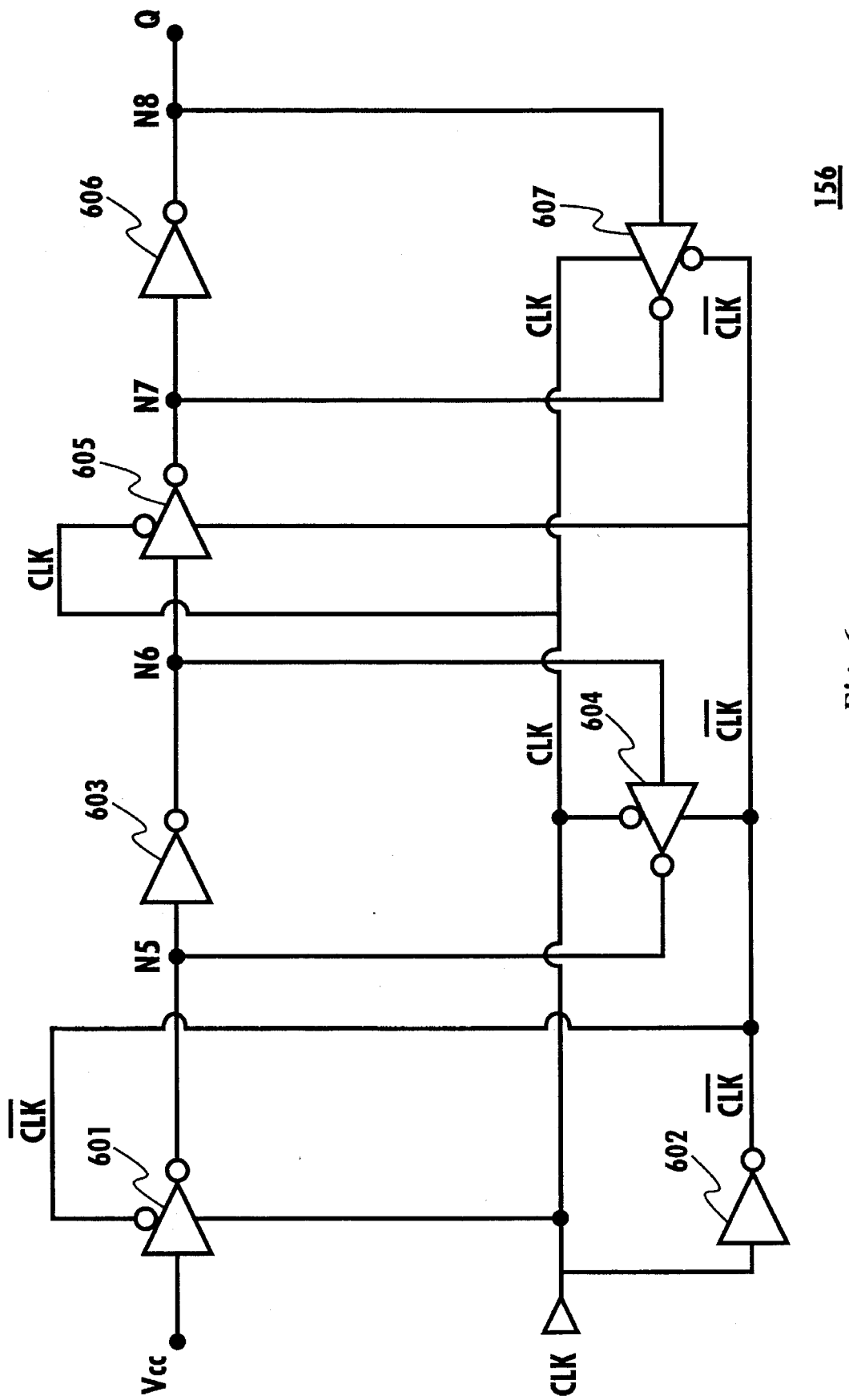
FIG. 6 is a schematic diagram of the flip-flop of FIG. 3.
Figure 8B:
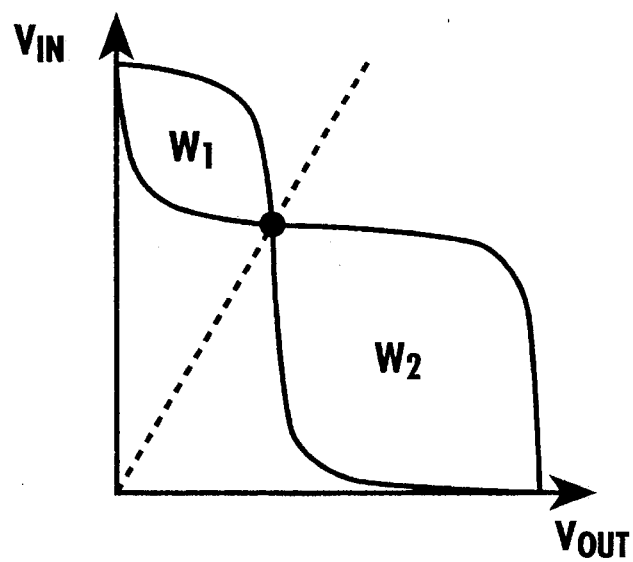
Figure 8C:
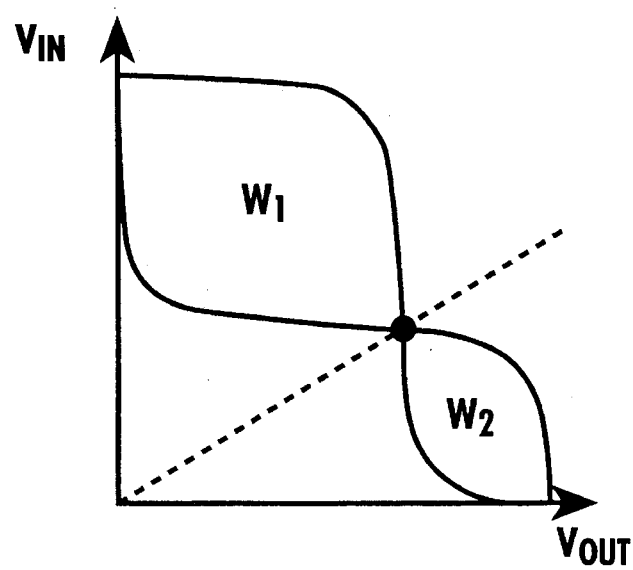

FIG. 8B illustrates transfer curves for an inverter such as that which may be formed by inverters 606 and 607 of FIG. 6. As illustrated in FIG. 8B, the threshold voltage of the first inverter (strong N/weak P) has been lowered, whereas the threshold of the second inverter (strong P/weak N) has been raised such that W2>W1. This type of inverter has an improved high voltage noise immunity over the balanced latch, but a somewhat reduced low voltage noise immunity as compared to he balanced latch. Thus, in response to transient supply voltages on power-up the latch formed by inverters 606 and 607 may be predisposed to output a low level logic signal FIG. 8C illustrates transfer curves for an inverter having inverse characteristics to that of FIG. 8B.

Since the bus type signal is output and latched only once, it is essential that flip-flop 156 power up in a low output state. If flip-flop 156 powered up in a high output state, then whatever signal is present at the input of latch 152 may be clocked out as the INT_BUS_TYPE signal. Subsequent toggling of flip-flop 156 would not correct the bus type already latched by latch 152, and device 100 may receive an erroneous bus type signal as a result. The use of a strong-N inverter in flip-flop 156 insures that INT_BUS_TYPE will not be clocked out until a reset signal is received, and thus the correct bus type signal will be output.

Thus, upon power-up, it is assured that flip-flop 156 will power up in a grounded state, despite fluctuations in power supply upon power-up. Since inverters 606 and 607 are physically located close to each other on a semiconductor chip, there should be relatively little difference in supply voltage to inverters 606 and 607 due to reactance on the chip and the like. Thus, despite fluctuations in supply voltage, flip-flop 156 will remain low until clocked by the trailing edge of signal RST when a reset signal is received from either an ISA or PCI bus system.

Bus identification circuit 150 may be economically implemented using only two latches, a flip-flop, and some combinational logic. Each latch may in turn comprise three to four gates, or a total of about 40 transistors in total. Thus, the bus identification circuit of the present invention provides reliable bus identification without using a significant amount of chip space.

In addition, the bus identification circuit 150 of the present invention makes use of a multi-function input pin and reset pin to determine bus type. Thus, additional pins are not required for a semiconductor device in order to determine bus type. Pin count for a semiconductor device is thus reduced or minimized.

While the preferred embodiment and various alternative embodiments of the invention have been disclosed and described in detail herein, it may be apparent to those skilled in the art that various changes in form and detail may be made therein without departing from the spirit and scope thereof.

For example, while the present invention has been discussed in terms of identifying ISA and PCI bus types, other bus types may be similarly identified, including the VESA and VL or local busses. Similarly, other input pins having signals characteristic of system bus type may be utilized in order to detect system bus type. Alternatively, a specialized pin may be utilized with the bus identification circuitry of the present invention to reliably detect system bus type.

Moreover, the combinational logic circuitry of FIG. 3 may be reconfigured to identify host system bus type from the polarity of the reset signal, rather than from the voltage level of the multi-function input line. This, for example, combinational logic circuitry may be utilized, along with a latch or latches to determine host bus type depending upon whether system reset signal RESET is a positive or negative going pulse. Moreover, the combinational logic circuitry of the present invention may be suitably modified to detect host system bus type from the initial logic level of the system bus RESET line (e.g., high level=PCI bus, low level=ISA bus).

What is claimed is:

1. A transience-resilient device for a computer system having one of a predetermined number of bus types, said device comprising:

a first input line for receiving a first signal from a multi-function input line provided for transmitting data or other signals to a device from a host CPU;

a second input line for receiving a system reset signal from the computer system; and a bus type identification circuit, coupled to said first and second input lines, to latch the first signal and output a bus type identification signal for reconfiguring a device in conformity with said bus type identification signal, wherein said bus type identification circuit comprises:

a first latch, coupled to said first and second input lines, for latching the first signal in response to the system reset signal;

a second latch, coupled to said first latch and a flip-flop, for receiving and latching the first signal from said first latch and outputting the first signal as a bus type identification signal in response to a supply voltage received from said flip-flop; and said flip-flop, coupled to said second input line and said supply voltage, for outputting said supply voltage in response to said system reset signal, wherein said flip-flop is configured to generate a ground level voltage upon application of the supply voltage to said flip-flop and output a high level logic signal at the trailing edge of said system reset signal received over said second input line, said flip-flop comprising:

a third latch coupled to said supply voltage and said second input line and a fourth latch, coupled to said first latch and said second input line.

2. The device of claim 1, wherein said fourth latch comprises:

a first inverter having an input terminal coupled to said supply voltage and an output terminal coupled to an output of said flip-flop; and a second inverter having an input terminal coupled to the output terminal of said first inverter and an output terminal coupled to the input terminal of said first inverter;

said first inverter comprising:

a first transistor of a first type having a first predetermined threshold voltage; and a second transistor of a second type having a second predetermined threshold voltage;

wherein said first threshold voltage is lower than said second threshold voltage such that said first inverter will output a predetermined level logic signal in response to a transient voltage input such that said fourth latch will output a ground level signal in response to a transient input voltage.

3. The device of claim 2, wherein said system reset signal may vary depending upon computer system bus type and said bus type identification circuits further comprises:

logic circuitry, coupled to said second input line for receiving the system reset signal from the computer system and outputting a device reset signal.

4. The device of claim 3, wherein said system reset signal may comprise a negative going pulse for a PCI bus computer system and a positive going pulse for an ISA bus system and said logical circuitry generates a positive going pulse in response to a system reset signal for either a PCI bus system or an ISA bus system.

5. The device of claim 4 wherein said logic circuitry comprises:

an AND gate having a first input coupled to said first input line and a second input coupled to said second input line;

a NOR gate having a first input coupled to said first input line and a second input coupled to said second input line; and an OR gate having a first input coupled to an output of said AND gate and a second input coupled to an output of said NOR gate, said OR gate outputting said device reset signal.

6. The device of claim 1, wherein said multi-function input line is tied to a ground level voltage through a pull-down resistor if the computer system is a PCI bus computer system.

7. The device of claim 1, wherein said multi-function input line is tied to a high logic level voltage through a pull-up resistor if the computer system is an ISA bus computer system.

8. A bus identification circuit resilient to Dower transience and coupled to a host system bus including a first and second input lines, said bus identification circuit including:

a first latch, coupled to said first and second input lines, for latching a first signal in response to a system reset signal;

a second latch, coupled to said first latch and a flip-flop, for receiving and latching the first signal from said first latch and outputting the first signal as a bus type identification signal in response to the supply voltage received from said flip-flop; and said flip-flop, coupled to said second input line and a supply voltage, for outputting said supply voltage in response to said system reset signal, wherein said flip-flop is configured to generate a ground level voltage upon application of the supply voltage to said flip-flop and output a high level logic signal at a trailing edge of said system reset signal received over said second input line, said flip-flop comprising:

a third latch coupled to said supply voltage and said second input line and a fourth latch, coupled to said first latch and said second input line.

9. The bus identification circuit of claim 8, wherein said fourth latch comprises:

a first inverter having an input terminal coupled to said supply voltage and an output terminal coupled to an output of said flip-flop; and a second inverter having an input terminal coupled to the output terminal of said first inverter and an output terminal coupled to the input terminal of said first inverter;

said first inverter comprising:

a first transistor of a first type having a first predetermined threshold voltage; and a second transistor of a second type having a second predetermined threshold voltage;

wherein said first threshold voltage is lower than said second threshold voltage such that said first inverter will output a predetermined level logic signal in response to a transient voltage input such that said fourth latch will output a ground level signal in response to a transient input voltage.

10. The bus identification circuit of claim 9, wherein said system reset signal may vary depending upon host system bus type, said bus identification circuit further comprising:

logic circuitry, coupled to said second input line for receiving the system reset signal from the computer system and outputting a device reset signal.

11. The bus identification circuit of claim 10, wherein said system reset signal may comprise a negative going pulse for a PCI host system bus and a positive going pulse for an ISA host system bus and said logical circuitry generates a positive going pulse in response to a system reset signal for either a PCI host system bus or an ISA host system bus.

12. The bus identification circuit of claim 11 wherein said logic circuitry comprises:

an AND gate having a first input coupled to said first input line and a second input coupled to said second input line;

a NOR gate having a first input coupled to said first input line and a second input coupled to said second input line; and an OR gate having a first input coupled to an output of said AND gate and a second input coupled to an output of said NOR gate, said OR gate outputting said device reset signal.

13. The bus identification circuit of claim 12, wherein said first input line comprises a multi-function input line.

14. A transience-resilient method of automatically detecting system bus type from a bus type identification signal received over a first input line of a host system bus and a system reset signal transmitted over a second input line of a host system, the method comprising the steps of:

receiving and latching a first signal from said first input line in response to a system reset signal and outputting a first bus identification signal;

receiving and latching the first bus identification signal response to a latching signal and outputting a second bus type identification signal; and outputting said latching signal in response to the system reset signal, wherein said step of outputting said latching signal comprises the steps of:

latching a supply voltage signal in response to the system reset signal and outputting a low level logic signal;

outputting a low level latching signal upon power up; and latching said low level logic signal in response to said system reset signal and outputting a high level logic signal in response to said ststem reset signal as the latching signal.

15. The method of claim 14, wherein said step of outputting a low level logic signal upon power up comprises the step of generating an output logic level signal as a latching signal in an inverter comprising a first transistor of a first type having a first predetermined threshold voltage and a second transistor of a second type having a second predetermined threshold voltage higher than said first predetermined threshold voltage such that the inverter will output a predetermined level logic signal in response to a transient voltage input.

* * * * *

UNITED STATES PATENT AND TRADEMARK OFFICE
CERTIFICATE OF CORRECTION

PATENT NO. : 5,608,877
DATED : March 4, 1997
INVENTOR(S) : Chih-Ta Sung et al.

It is certified that error appears in the above-indentified patent and that said Letters Patent is hereby corrected as shown below:

In the ABSTRACT, line 10, change "flip-flip" to -- flip-flop --.

Signed and Sealed this

Second Day of December, 1997

Attest:

Attesting Officer

BRUCE LEHMAN

Commissioner of Patents and Trademarks